Aug. 9, 1932. W. K. LEWIS 1,870,854
PROCESS FOR SEPARATING MIXTURES OF SUBSTANCES ONLY PARTIALLY MISCIBLE
Filed April 25, 1929
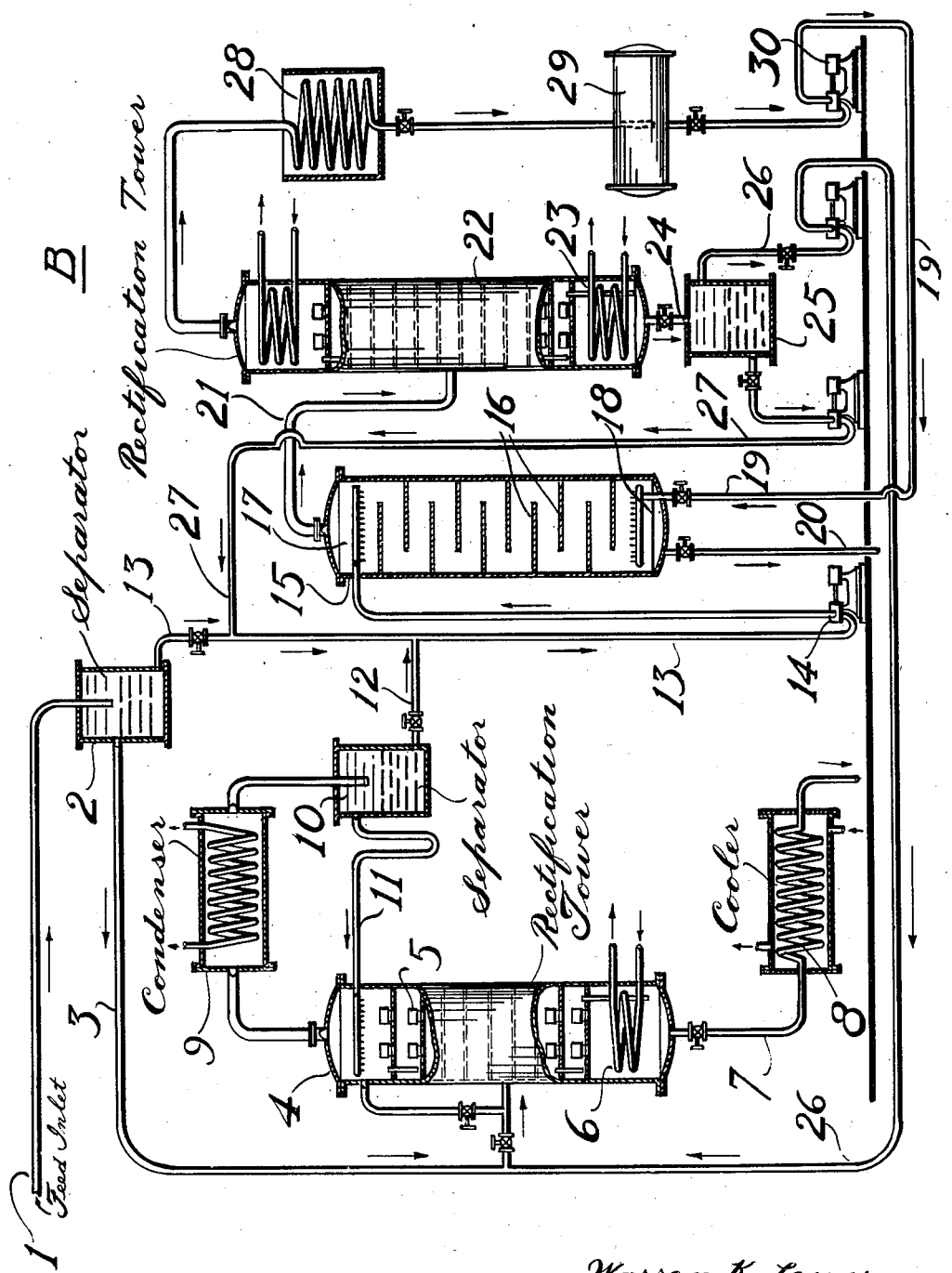
Warren K. Lewis.
INVENTOR
BY
ATTORNEY Patented Aug. 9, 1932

1,870,854

UNITED STATES PATENT OFFICE

WARREN K. LEWIS, OF NEWTON, MASSACHUSETTS, ASSIGNOR TO STANDARD OIL DEVELOPMENT COMPANY, A CORPORATION OF DELAWARE

PROCESS FOR SEPARATING MIXTURES OF SUBSTANCES ONLY PARTIALLY MISCIBLE

Application filed April 25, 1929. Serial No. 358,013.

The present process relates to the art of separating liquid mixtures and more specifically comprises an improved process for obtaining substantially anhydrous materials from aqueous mixture of substances which are only partially miscible with water. My invention will be fully understood from the following description and the drawing which illustrates one form of apparatus suitable for carrying out my invention.

The drawing is a diagrammatic view in sectional elevation of an apparatus constructed according to my invention and indicates the flow of materials.

In the following description my process is described as preferably applied to the separation of mixtures of water and fusel oil, but it should be understood that the method is applicable to the aqueous mixtures such as aniline and water, furfurol and water, or in fact any substance which is only partially miscible with water and which does not form homogeneous constant boiling mixtures with water.

Referring to the drawing, the reference character 1 denotes a feed pipe which conducts a mixture of water and fusel oil from storage (not shown) to a separator 2. The feed mixture may be in a single phase rich in either alcohol or in water or there may be two phases as will be understood. The alcoholic layer is decanted from separator 2, and conducted by line 3 to a rectification column 4, which may be constructed in any preferred manner such as with bell cap plates 5. A closed steam coil 6 furnishes heat to the lower part of column 4 and substantially anhydrous alcohol is withdrawn by line 7 thru cooler 8 to storage (not shown).

Vapor from the top of column 4 passes thru a condenser 9 in which the vapor is condensed and distillate is discharged into a separator 10. The distillate separates into two layers of which the alcoholic is decanted and returned to column 4 as reflux by line 11.

The aqueous layers from separators 2 and 10 are withdrawn by lines 12 and 13 respectively, admixed and forced by pump 14 into an extraction system 15. The extraction system is preferably in the form of a vertical column with baffling means 16 at the intermediate section and with separator chambers 17 and 18 at the top and bottom. A suitable solvent, such as a light hydrocarbon oil is forced into the lower part of column 15 by a pipe 19 and water substantially free of alcohol is withdrawn by pipe 20. The solvent charged with alcohol and with some water is withdrawn from the column 15 by line 21 which discharges into a rectification column 22 which is preferably fitted with bell cap plates similar to column 4. The lower part of column 22 is heated by a steam coil 23 and after the distillation of the solvent a residuum of alcohol and water is withdrawn by pipe 24. The mixture is separated in two phases in a separator 25, the alcoholic layer being conducted to column 4 by line 26 and the aqueous layer returned to the extraction column 15 by line 27 for re-extraction. The vaporized solvent is condensed in condenser 28 from which it flows into storage drum 29 and is recirculated into extractor 15 by pump 30 and line 19 as previously described.

In the operation of my process a liquid mixture which is largely higher alcohols with a small amount of water is rectified to produce a residue of substantially anhydrous alcohols and a distillate which separates into alcoholic and aqueous layers. The alcoholic layer is returned to the rectification column as reflux and the aqueous layer is extracted preferably in a counter-current system with a low boiling solvent such as a low boiling hydrocarbon, which is capable of dissolving the alcohols from the bulk of the water. While I prefer a hydrocarbon solvent, such as propane, butane, or pentane, or a mixture of any or all of these substances, other organic liquids are suitable such as methyl or ethyl ether, chloroform, carbon-bisulphide, carbon tetrachloride or the like. The solvent chosen is preferably one readily separable from the extracted organic liquid. It is preferable to carry out the extraction under sufficient pressure so that the solvent may be in the liquid state at normal temperatures, but if preferred artificial cooling may be employed. The solvent is then rectified from the mixture and it is preferably done under such pressure that the solvent may be condensed at normal cooling water temperatures. After removal of the solvent, the residue separates into two layers, the alcoholic is returned to the column which produces anhydrous alcohol and the aqueous layer is re-extracted with the solvent. In this manner the liquid mixture may be separated into substantially water-free higher alcohols and alcohol-free water.

It will be understood that if the feed stock be largely aqueous with only a small quantity of higher alcohols in solution, the mixture may either be distilled first to produce a distillate richer in higher alcohol and a residue of water which is discarded or it may be merely extracted as shown.

In some cases it may be desirable to carry out the rectification in column 4 under vacuum and the well known Schneible columns may be used. It will be also understood that by the term "rich in the organic substance" I wish to designate those solutions to which a large quantity of water cannot be added without separation of phases and in the same sense "rich in water" indicates that the organic material cannot be added in large quantity without separation of phases.

While I have described my process in reference to aqueous mixtures and particularly in reference to aqueous mixtures of higher alcohols which do not form homogeneous constant boiling mixtures with water, the process may be applied to non-aqueous mixtures of liquids which are only partially miscible and which do not form constant boiling mixtures, as will be readily apparent to those skilled in the art.

My process is not to be limited by any theory of the mechanism of either of the steps of the process nor to the production of anhydrous higher alcohols alone, since it is applicable to use with other liquids and liquid mixtures.

My invention is to be limited only by the following claims in which I wish to claim all novelty inherent in the invention.

I claim:

1. In the process of separating water from aqueous mixtures of organic liquids which are only partially miscible with water and do not form homogeneous constant boiling mixtures with water, the improvement which comprises first separating the bulk of the organic liquid in substantially anhydrous form by rectification, taking off from the rectification stage an aqueous product containing some of the organic liquid, contacting at least a portion of said aqueous product with a liquid organic solvent capable of dissolving the organic liquid but immiscible with water, withdrawing the solvent containing dissolved organic liquid and some water, separating the solvent from the organic liquid dissolved therein, whereby a mixture rich in the organic liquid is obtained, and returning the last-mentioned mixture to the rectification stage.

2. Process according to claim 1 in which a solution rich in the organic liquid is rectified to produce a residue substantially free of water and a distillate which separates into two phases, the one rich in the organic liquid, the other in water, returning the former to the rectification process as reflux and returning the latter to the extraction step.

3. Process according to claim 1 in which a low boiling hydrocarbon is used as the solvent.

4. Process according to claim 1 in which extraction with a low boiling solvent and distillation of the solvent is accomplished under superatmospheric pressure.

5. Process according to claim 1, in which the mixture of organic liquid and water obtained by expelling the solvent is stratified and separated by decantation into alcohol and water layers, the former being passed to the rectification stage and the latter to the extraction stage.

6. Process according to claim 1, in which distillate from the rectification stage is collected, allow to stratify, and an alcohol layer and a water layer are separately withdrawn, the former being passed as reflux to the rectification stage and the latter being passed to the extraction stage.

7. Process according to claim 1 in which a mixture comprising water and fusel oil is substantially dehydrated.

WARREN K. LEWIS.